S. SCOGNAMILLO.
TIRE.
APPLICATION FILED SEPT. 25, 1911.
1,061,927.
Patented May 13, 1913.
2 SHEETS—SHEET 1.
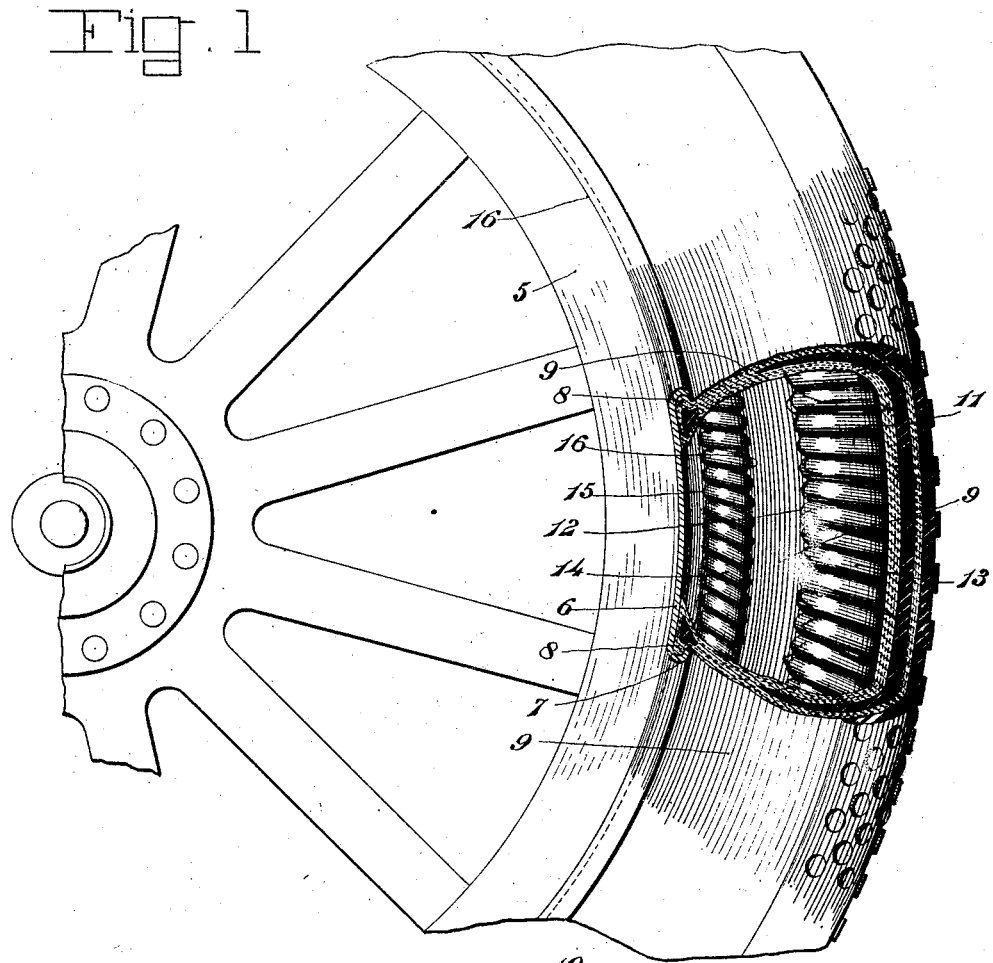
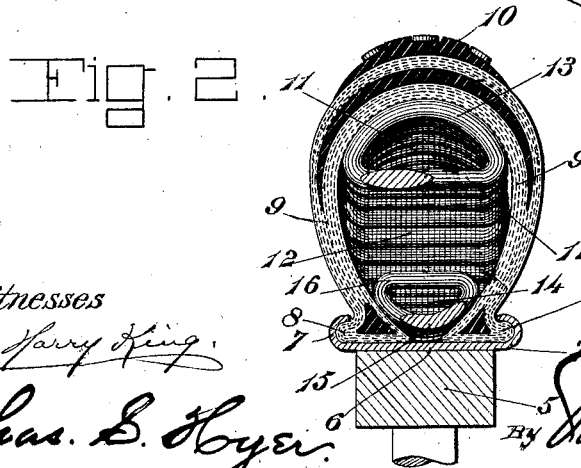
Witnesses
Harry King.
Chas. E. Hyer.
Salvatore Scognamillo
By James L. Norris Jr.
Atty

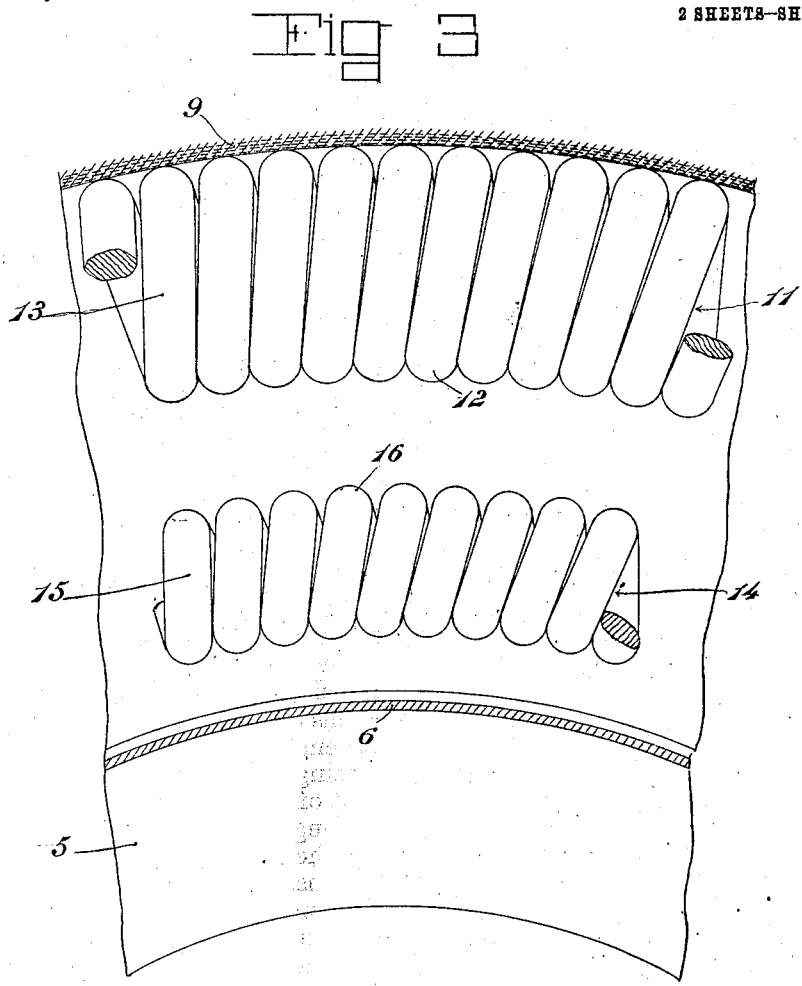

UNITED STATES PATENT OFFICE.

SALVATORE SCOGNAMILLO, OF NEW YORK, N. Y.

TIRE.

1,061,927.

Specification of Letters Patent.

Patented May 13, 1913.

Application filed September 25, 1911. Serial No. 651,206.

*To all whom it may concern:*

Be it known that I, SALVATORE SCOGNAMILLO, a citizen of the United States, residing at New York, in the county of New York and State of New York, have invented new and useful Improvements in Tires, of which the following is a specification.

This invention relates to vehicle tires of that class particularly adapted for use on the wheels of automobiles, motor trucks and other vehicles, and the primary object of the same is to form a tire of the cushion type without the usual inner inflated tube and to replace the latter by a particular form of spring means which operates to provide a maximum resiliency with a minimum weight and overcome the disadvantages incident to punctures and collapse of the tire and to maintain a reliable and positive tractive action of the tire relatively to the surface over which it moves.

A further object of the invention is to provide a wheel tire of comparatively simple construction by utilizing the main body of the tire or outer casing as found in the market and applying thereto the features of improvement without requiring any structural change of the said casing and thereby reduce the cost of production.

With these and other objects and advantages in view the invention consists in the construction and arrangement of the several parts which will be more fully hereinafter described and claimed.

In the drawings: Figure 1 is an elevation of a portion of a wheel and tire, the latter being broken away and sectioned to illustrate the features of the invention. Fig. 2 is a transverse vertical section through the tire and a portion of the rim as shown by Fig. 1. Fig. 3 is an enlarged longitudinal vertical section of a portion of the tire showing the relative position of the improved spring means therein.

The numeral 5 designates a wheel rim of any suitable form embodying the usual channel member or plate 6 provided with inturned flanges 7 to engage and hold the clenchers or securing terminals 8 of an outer tire casing 9 which may be of any suitable construction or similar to that usually employed with an inner tube. The outer casing or tube 9 is shown as provided with a shoe 10 for well known purposes, and the said shoe may be constructed of metal, such as lead, or of rubber or rubber composition, or a combination of rubber and metal as may be desired. The outer casing or tube 9 as shown is organized to resist penetration or puncture, and it will be understood that any form of rim and attaching means for the tire may be adopted and the form illustrated is simply used to demonstrate one practical application of the invention which will now be particularly described.

The invention primarily embodies an outer spring 11 of a particular form which is held in close engagement with the inner surface of the outer or tread portion of the casing 9, the said spring being semicircular in cross-section and coiled and continuous throughout the entire portion of the casing 9. The straight horizontally disposed base members 12 of the spring 11, as clearly shown by Fig. 3 on an enlarged scale, are in close contact at their opposite side portions and the arcuate or curved members 13 in engagement with the inner surface of the casing 9 are slightly spaced or are normally out of contact, all of the convolutions of the spring being in close relation to each other.

The object of constructing the spring 11 as just specified is to provide a strong resistance means within the casing 9 to hold the tread portion of the latter in positive distended condition when relieved of tractive compression and yet to have a maximum resiliency to render the tire as a whole effective in performing its function. When the tire is subjected to tractive compression the outer curved members 13 of the spring 11 move toward each other along the portion of the spring affected by the compression and the horizontally straight members 12 remain in contact and serve as fulcrum means for the said members 13. By this means a resisting base for the spring as a whole is provided and a resumption of the convolutions to normal relative positions is insured when they are relieved of tractive compression and distortion of the spring is obviated with the material advantages of greater efficiency and durability. If an excessive pressure is exerted on the tire the convolutions of spring 11, after closing as just explained, will move as a unit or the portion of the spring as a whole adjacent to the surface on which the wheel moves and subjected to tractive compression, will move inwardly with the casing 9, and the inner flat or horizontally disposed base members 12 provide for a clearance within the casing so that the said outer spring 11 may be forced inwardly a considerable distance or under excessive compression without engaging the inner fastening means for the clenchers, which in the present instance consists of the inner spring 14. The inner spring 14 coacts with the outer spring 11 in maintaining the casing 9 in proper distended condition at the base of the casing or adjacent to the wheel rim. The inner attached portions or clenchers 8 of the casing or outer tube 9 are engaged and expanded by the inner spring 14 similar in contour to the spring 11 but reversed as to the disposition of the curved and horizontally straight members 15 and 16. The horizontally straight members 16 of the spring 14 are slightly separated and the curved members 15 are in contact, the curved members becoming the base of the spring and exerting a strong pressure of a yielding character on the portions of the tire secured to the rim to reliably hold the latter when the tire is applied to the rim. It will be seen that the spring 14 engages the casing 9 at opposite points near the juncture of the opposite parts of the casing with the clenchers and that a considerable portion of the said spring 14, including the flat side thereof made up of the horizontal members 16 projects into the space inclosed by the said casing, and when compression is exerted on the tire at the point of engagement of the latter with the ground surface, the said spring 14 tightens relatively to the parts of the casing engaged thereby and the horizontal members 16 are closed, and therefore the two springs 11 and 14 coact in maintaining the shape of the casing 9. Under excessive pressure the two adjacent flat sides of the springs 11 and 14 are apt to come into engagement, and under such conditions the the convolutions of the two springs will be closed and the said springs will conjointly sustain the tire and the load with cushioning effect, as each spring will then bodily cushion the other and a strong reinforce will result in view of the combined strength of the two springs under these conditions and a breakdown of the tire under excessive compression will be obviated. It will therefore be seen that it is intended that the base of each spring 11 and 14 is contracted or has the members thereof continually in contact to set up a sufficient resistance to the movement of the remaining portions of the convolutions of each spring to insure the performance of the functions desired and to give to the tire the requisite stability. Each of the springs 11 and 14 is tightly introduced in the outer casing or tube 9 and is frictionally held in the latter, there being ample space between the opposing portions of the two springs within the casing or tube 9 to compensate for maximum compressive movements.

Any suitable means may be used for introducing the springs in the outer casing or tube, and the proportions of the springs may be varied in accordance with the size of the tire.

What is claimed is:

A tire comprising an inclosing casing having an outer tread portion, and two continuous coiled springs inserted through the casing and both semicircular in cross section and respectively engaging by frictional contact the inner surfaces of the tread and rim attaching portions of the casing, the outer tread engaging spring having an inner flat side with the convolutions normally in close contact and the outer curved portions of the convolutions normally open and out of contact, and the spring engaging the rim attaching portion of the tire having the lower curved portions of the convolutions normally closed and the outer flat portions of the convolutions normally open to hold the casing in positive shape and provide a resilient cushion for said casing, the two adjacent flat sides of the springs providing a clearance for all moderate compressions of the casing and forming stop surfaces when the casing is subjected to maximum compression.

In testimony whereof I have hereunto set my hand in presence of two subscribing witnesses.

SALVATORE SCOGNAMILLO.

Witnesses:
   Chas. S. Hyer,
   F. B. Keefer.